COMPOSITIONS,
COATING OR PLASTIC.

Patented Aug. 1, 1933

1,920,358

UNITED STATES PATENT OFFICE 1,920,358

INSULATING CONCRETE

Horace N. Clark, Bridgewater Township, Somerset County, N. J., assignor to Refractory and Engineering Corporation, New York, N. Y., a Corporation of New Jersey No Drawing. Application January 7, 1931
Serial No. 507,303

2 Claims. (Cl. 106—18)

This invention relates to a quick setting, strong concrete having particular utility as a heat resisting, heat insulating medium and possessing the property of being capable of being quickly and readily poured to form large insulating blocks of great strength and durability.

Heat insulating materials are well known in the industrial arts and, while certain of such materials have obtained a fair degree of commercial success, they are, for the most part, generally open to some objection or other. For instance, certain of such materials may possess high heat insulating powers, but their strength and resistance to cracking may be so low as to prevent their use in certain fields. On the other hand, compositions having high strength only attain this strength by being first heated to dry the same. These compositions moreover shrink to a greater or less extent under such treatment and tend, therefore, to crack and disintegrate.

I have now discovered a composition suitable for making insulating concrete which is non-shrinking, very strong, highly resistant to heat and cracking, possesses a high insulating power, can be easily and readily poured into blocks of large size, is quick setting and sufficiently cheap to permit its use on a large and economical industrial scale in any of the arts requiring high heat insulating bodies. In addition my concrete attains its great strength without any heating operation.

It is accordingly an object of this invention to provide a mixture for forming a hard, quick setting, non-shrinking, heat insulating concrete.

A further object is to provide a readily pourable, strong, quick setting, non-shrinking, heat insulating concrete which attains its strength without any heat treatment.

A still further object resides in the production of strong, heat and cracking resisting, non-shrinking, heat insulating concrete blocks of any size.

It is a further object of this invention to provide a mixture which, upon wetting with water, can be readily poured to form a moldable mass which quickly sets into a strong, heat and cracking resisting, non-shrinking, heat insulating block.

Other and further important objects of this invention will become apparent from the following description and appended claims.

The essential ingredients of my concrete comprise an intimate mixture of a quick setting Portland cement, preferably that known to the trade as Incor cement, and a rather voluminous heat insulating body, such as mineral wool. When the above mixture is wetted with water and molded a chemical reaction takes place therein, the water being eliminated without shrinkage of the concrete taking place. The wool is disseminated throughout the resulting block and because of its particular structure the molecules or particles thereof after said chemical reaction adhere very tenaciously to the particles of the cement with the result that the molded block is extremely strong, resists cracking to an exceptional degree and has no tendency to shrink even when heated. In other words, the cement and wool particles appear to have a cohesive affinity for each other which produces a particular cooperation between these two bodies and forms a hard, cracking resisting non-shrinking heat resisting block. In addition, the Portland cement lends to the concrete the property of quick setting, which is very desirable and often essential in providing insulation for certain heating devices.

The amount of the cement compounded in the mixture may vary over a rather wide range but is preferably regulated to obtain maximum speed of set consistent with high heat resistance, since the heat resistance of the concrete varies indirectly with the amount of cement employed. In forming the concrete, the above ingredients are usually admixed with a light-weight filler, such as diatomaceous earth, to give body to the concrete without materially increasing its weight.

The amount of the various ingredients employed is not fixed to any one particular ratio, especially valuable concretes being obtained, however, with mixtures having the following proportions by weight:

| | Percent |
|---|---|
| Cement | 15 to 40 |
| Diatomaceous earth | 20 to 30 |
| Wool | 40 to 65 |

As stated above, the cement preferably employed is that known as Incor cement, but, if desired, this may be replaced by a calcium aluminate cement containing at least 30% of alumina, such as that known to the trade as Lumnite cement. This cement has substantially the following composition:

| | Percent |
|---|---|
| Ignition loss | 2 |
| $SiO_2$ | 5.25 |
| $Al_2O_3$ | 43.12 |
| CaO | 36.50 |
| MgO | 1.50 |
| $Fe_2O_3$ | 36.06 |

Any other Portland cement and even plaster of Paris may also be employed.

As has been pointed out, one of the greatest advantages of my concrete is the ease with which it can be poured and the speed with which it sets to form insulating blocks of any size which do not shrink even upon being heated, thus eliminating any danger of the blocks cracking. This feature renders the concrete especially suitable for insulating large heating structures wherein the conventional small insulating blocks or bricks can be replaced in toto by a single molded block of my concrete. Obviously such a concrete, especially in view of the non-shrinking quick setting nature of the same, facilitates the erection of heat insulating structures and materially lessens the cost thereof.

In molding the above mixture, the amount of water used may vary quite considerably. For instance, the amount used may be merely that necessary to wet the mixture or again may be such as to form readily a flowable suspension. This feature is of course optional at the will of the operator to secure the best results consistent with the particular bodies, range of proportions, size of blocks and properties desired.

It will, of course, be appreciated that certain details of my invention may be altered and accordingly I do not wish to be limited in my invention except as necessitated by the prior art and the appended claims.

What I claim and desire to secure by Letters Patent is:

1. A new composition of matter for forming strong, heat insulating, non-shrinking concrete comprising an intimate mixture of 15 to 40% of a quick setting Portland cement, 40 to 65% of mineral wool and 20 to 30% of a diatomaceous earth.

2. A quick setting, strong, high heat insulating, non-shrinking concrete comprising from 15 to 40% of a quick setting Portland cement, 40 to 65% of mineral wool, 20 to 30% of a diatomaceous earth and water.

HORACE N. CLARK.